(12) United States Patent
Lin

(10) Patent No.: US 7,956,839 B2
(45) Date of Patent: Jun. 7, 2011

(54) APPARATUS AND METHOD FOR MANAGING THE POWER OF ILLUMINATION DEVICES

(75) Inventor: Cing-Shin Lin, Taipei Hsien (TW)

(73) Assignees: Premier Image Technology (China) Ltd., Foshan, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 456 days.

(21) Appl. No.: 12/118,948

(22) Filed: May 12, 2008

(65) Prior Publication Data

US 2009/0085486 A1    Apr. 2, 2009

(30) Foreign Application Priority Data

Sep. 27, 2007   (CN) .......................... 2007 1 0201867

(51) Int. Cl.
G09G 3/36    (2006.01)
(52) U.S. Cl. .......... 345/102; 345/82; 345/211; 345/212; 345/204
(58) Field of Classification Search ............. 340/539.25, 340/539.23, 539.22, 539.3, 540, 541, 555, 340/693.3, 815.45, 815.54; 345/102, 212–214, 211, 204, 82, 76; 315/247, 246, 224, 225, 274–289, 291, 297, 307–311
See application file for complete search history.

(56) References Cited

U.S. PATENT DOCUMENTS

| | | | | |
|---|---|---|---|---|
| 5,012,392 A | * | 4/1991 | Hochstein | ......................... 362/4 |
| 7,740,371 B1 | * | 6/2010 | Lebens et al. | ................. 362/205 |
| 2002/0015097 A1 | * | 2/2002 | Martens et al. | ............... 348/207 |
| 2006/0038499 A1 | * | 2/2006 | Yeh | ................. 315/149 |
| 2006/0071605 A1 | * | 4/2006 | Diederiks | ...................... 315/76 |

* cited by examiner

Primary Examiner — Tuyet Thi Vo
(74) Attorney, Agent, or Firm — Andrew C. Cheng

(57) ABSTRACT

An apparatus for managing the power of an illumination device supplied by a power source includes a switch, a switch controller, an imaging unit, and a pattern recognition unit. The switch is configured for electrically connecting or disconnecting the illumination device and the power source. The switch controller is configured for controlling the switch, thereby switching off the illumination device. The imaging unit is configured for capturing an image of an illuminated area illuminated by the illumination device. The pattern recognition unit is configured for detecting whether any person is contained in the captured image, and if not, instructing the switch controller to switch off the illumination device.

6 Claims, 1 Drawing Sheet

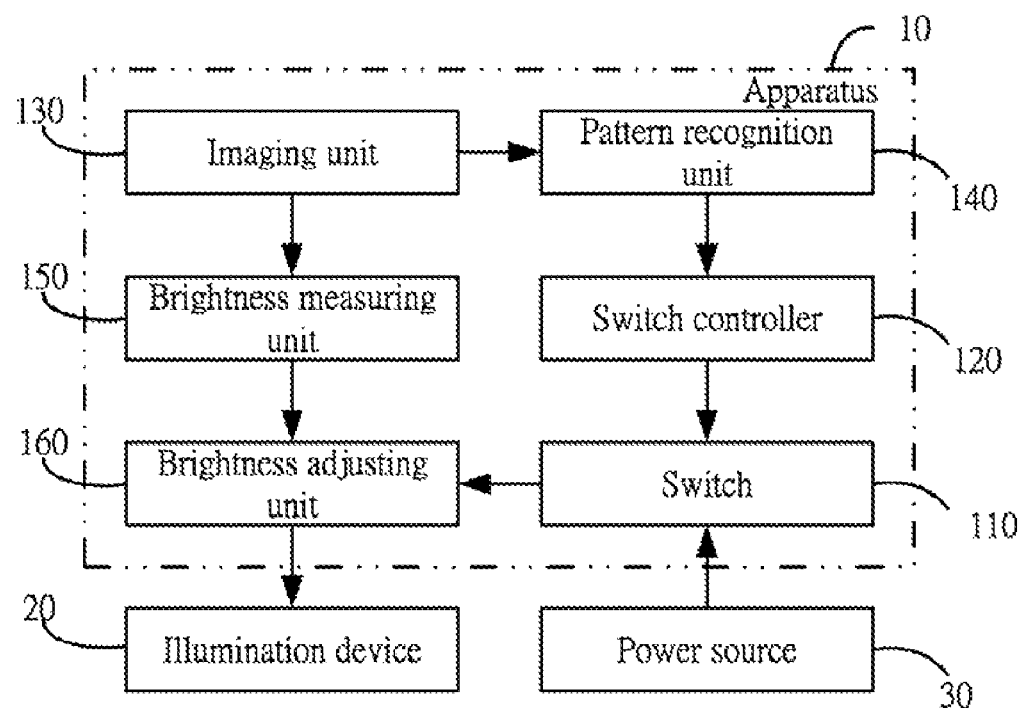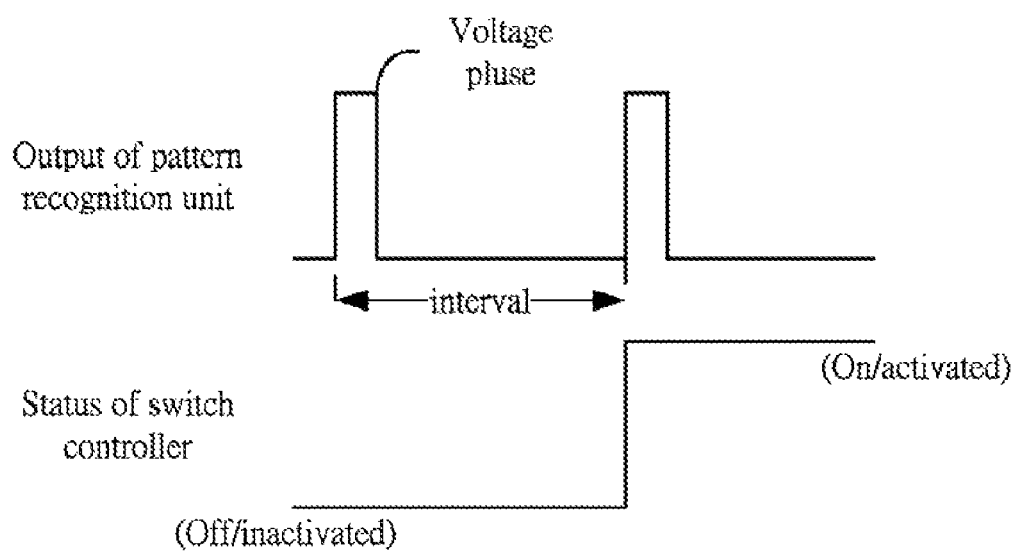

APPARATUS AND METHOD FOR MANAGING THE POWER OF ILLUMINATION DEVICES

BACKGROUND

1. Technical Field

The invention relates to illumination technology and more particularly, to an apparatus and a method for managing the power of an illumination device.

2. Description of Related Art

People often forget to turn off the lights before leaving their homes. This task can be very inconvenient or difficult to perform on a consistent basis. Therefore, it is desirable to provide an apparatus and a method for managing the power of an illumination device, which can overcome the above-mentioned problem.

SUMMARY

In a present embodiment, an apparatus for managing the power of an illumination device supplied by a power source includes a switch, a switch controller, an imaging unit, and a pattern recognition unit. The switch is configured for electrically connecting or disconnecting the illumination device and the power source. The switch controller is configured for controlling the switch, thereby switching off the illumination device. The imaging unit is configured for capturing an image of an illuminated area illuminated by the illumination device. The pattern recognition unit is configured for detecting whether or not anyone is present in the captured image, and if not, instructing the switch controller to switch off the illumination device.

BRIEF DESCRIPTION OF THE DRAWING

The FIGURE is a view showing a functional diagram of an apparatus for managing the power of an illumination device supplied by a power source and a timing chart of the output of a face recognition device of the system and the status of a switch controller of the system, according to an exemplary embodiment.

DETAILED DESCRIPTION OF THE EMBODIMENTS

Embodiments of the present apparatus and method will now be described in detail with reference to the drawing.

Referring to the FIGURE, an apparatus 10 for managing the power of an illumination device 20, such as an electrical bulb or an electrical tube, supplied by a power source 30, according to an exemplary embodiment, includes a switch 110, a switch controller 120, an imaging unit 130, and a pattern recognition unit 140. The switch 110 is configured for electrically connecting or disconnecting the illumination device 20 and the power source 30. The switch controller 120 is configured for controlling the switch 110, thereby switching off the illumination device 20. The imaging unit 130 is configured for capturing an image of an illuminated area illuminated by the illumination device 20. The pattern recognition unit 140 is configured for detecting whether any predetermined pattern (such as a whole person image or a portion of a person image) is present in the captured image, and if not, instructing the switch controller 120 to switch off the illumination device 20.

When the imaging unit 130 and the pattern recognition unit 140 are continuously running simultaneously, the apparatus 10 will regularly monitor whether anyone is in the illuminated area illuminated by the illumination device 20, and if not, automatically turn off the illumination device 20 in an effort to conserve energy. For example, the apparatus 10 can be applied to a living room lamp. It will continuously monitor whether anyone is in the living room, and automatically turns off the lamp if everyone has left the area without turning off the lamp.

The switch controller 120 is an electromechanical device and can be driven by voltage pulse(s). The pattern recognition unit 140 is a face recognition device that processes the captured image (typically including, e.g., image segmentation, noise reduction, edge detection, characteristic standardization, and characteristic recognition) to determine if the image contains any people, and if not, yields a driving pulse '1'. The switch controller 120 receives the driving pulse and cuts off the switch 110 to break the interconnection between the illumination device 20 and the power source 30.

Alternatively, the switch controller 120 can be a double (or more) checking device. That is, the switch controller 120 needs two (or more) consecutive pulses within a certain period of time, e.g., 5 min, or 10 min, to confirm that everyone has truly left the area.

The imaging unit 130 includes a still camera, or a video camera. In this embodiment, the imaging unit 130 is a video camera. Alternatively, the imaging unit 130 can include more than one video camera to enhance the rate of accuracy in its detection of people.

In other alternative embodiments, the apparatus 10 can further include a brightness measuring unit 150 and a brightness adjusting unit 160. The brightness measuring unit 150 is configured for measuring a brightness value of the captured image (or an average brightness value of the images captured by more than one video camera of the imaging unit 130), thereby obtaining the brightness of the illuminated area illuminated by the illumination device 20. The brightness adjusting unit 160 is configured for adjusting the brightness of the illumination device 20, based upon the measured brightness value. For example, the brightness adjusting unit 160 is a power adjusting device (e.g., a rheostat, or a transformer) electrically interconnected between the switch 110 and the illumination device 20. The brightness adjusting unit 160 compares the measured brightness value with a predetermined brightness value stored therein. If the measured brightness value is smaller than the predetermined brightness value, it increases the power output to the illumination device 10. If greater, it decreases the power output.

In order to use the illumination device 20, it must first be turned on via a button switch, a voice control switch, or an infrared control switch. After the illumination device 20 is powered on, the apparatus 10 is activated. The imaging unit 130 starts capturing consecutive images of the illuminated area illuminated by the illumination device 20 with an interval 5 min between each two consecutive images. The pattern recognition unit 140 processes the captured images to determine whether everyone has left the illuminated area. If yes (two driving pulses are yielded), the pattern recognition unit 140 instructs the switch controller 120 to turn off the illumination device 20. Before the illumination device 20 is automatically turned off, the brightness measuring unit 150 continues to measure the brightness values of the captured images. Subsequently, the brightness adjusting unit 160 can adjust the brightness of the illumination device 20 according to the measured brightness values in order to generate a comfortable level of light.

It will be understood that the above particular embodiments and methods are shown and described by way of illustration only. The principles and the features of the present invention may be employed in various and numerous embodiments thereof without departing from the scope of the invention as claimed. The above-described embodiments illustrate the scope of the invention but do not restrict the scope of the invention.

What is claimed is:

1. An apparatus for managing power of an illumination device supplied by a power source, comprising:
   a switch for forming an electrical interconnection between the illumination device and the power source;
   a switch controller for controlling the switch, and thereby breaking the electrical interconnection between the illumination device and the power source;
   an imaging unit for capturing an image of an illuminated area illuminated by the illumination device; and
   a pattern recognition unit for detecting whether any predetermined pattern is included in the captured image, yielding a plurality of voltage pulses with an interval, each of which is generated after a detection of a corresponding captured image when no predetermined pattern is found, and instructing the switch controller to break the electrical interconnection between the illumination device and the power source when receiving more than one consecutive voltage pulse.

2. The apparatus as claimed in claim 1, wherein the imaging unit and the pattern recognition unit are configured for continuously working.

3. The apparatus as claimed in claim 1, wherein the interval is selected from a group of: 5 minutes, and 10 minutes.

4. The apparatus as claimed in claim 1, wherein the imaging unit includes an element selected from a group of: still camera and video camera.

5. The apparatus as claimed in claim 1, further comprising:
   a brightness measuring unit for measuring a brightness value of the captured image; and
   a brightness adjusting unit for adjusting the brightness of the illumination device.

6. A method for managing power of an illumination device, the illumination device comprising a switch controller configured for automatically switching off the illumination device, the method comprising:
   turning on the illumination device;
   capturing an image of an illuminated area illuminated by the illumination device;
   processing the captured image to find out whether any predetermined pattern is included in the captured image;
   yielding a plurality of voltage pulses with an interval, each of which is generated after a detection of a corresponding captured image when no predetermined pattern is found; and
   instructing the switch controller to switch off the illumination device when receiving more than one consecutive voltage pulse.

* * * * *